(12) United States Patent  (10) Patent No.: US 6,168,866 B1
Clark  (45) Date of Patent: Jan. 2, 2001

(54) ABRASION AND STAIN RESISTANT CURABLE FLUORINATED COATING

(75) Inventor: Gregory D. Clark, St. Paul, MN (US)

(73) Assignee: 3M Innovative Properties Company, St. Paul, MN (US)

( * ) Notice: Under 35 U.S.C. 154(b), the term of this patent shall be extended for 0 days.

(21) Appl. No.: 09/136,185

(22) Filed: Aug. 19, 1998

(51) Int. Cl.$^7$ .......................... B32B 15/08; B32B 21/08; B32B 23/08; B32B 27/26; B32B 27/42

(52) U.S. Cl. .................... 428/421; 525/157; 525/158; 525/160; 525/165; 525/176; 525/178; 525/187; 525/199; 525/200; 525/221; 525/222

(58) Field of Search .................. 428/421, 422; 525/157, 160, 158, 199, 200, 221, 222, 165, 176, 178, 187

(56) References Cited

U.S. PATENT DOCUMENTS

| | | | |
|---|---|---|---|
| 2,803,615 | 8/1957 | Ahlbrecht et al. | 260/29.6 |
| 2,841,573 | 7/1958 | Ahlbrecht et al. | 260/79.3 |
| 4,295,976 | 10/1981 | Dessaint et al. | 252/8.9 |
| 4,513,059 | 4/1985 | Dabroski | 428/355 |
| 4,518,649 | 5/1985 | Wang et al. | 428/284 |
| 4,778,915 | 10/1988 | Lina et al. | 560/29 |
| 4,804,572 | 2/1989 | Bodrogi | 428/195 |
| 4,812,337 | 3/1989 | Sugimura et al. | 427/407.1 |
| 4,814,206 | 3/1989 | Hwang | 427/393.4 |
| 4,842,940 | 6/1989 | Yoshimura | 428/422 |
| 4,942,203 | 7/1990 | Conti-Ramsden et al. | 525/185 |
| 5,136,000 | 8/1992 | Luttenberger et al. | 526/245 |
| 5,262,444 | 11/1993 | Rusincovitch et al. | 521/50.5 |
| 5,292,796 | 3/1994 | Dams et al. | 524/598 |
| 5,387,646 | 2/1995 | Nakahata et al. | 525/103 |
| 5,420,204 * | 5/1995 | Valet et al. | 525/125 |
| 5,453,540 | 9/1995 | Dams et al. | 564/96 |
| 5,597,874 | 1/1997 | Anton et al. | 525/331.2 |

FOREIGN PATENT DOCUMENTS

| | | |
|---|---|---|
| 0 526 399 A2 | 2/1993 | (EP) . |
| 63-17940 | 1/1988 | (JP) . |
| 3-269184 | 11/1991 | (JP) . |
| 06025592 | 2/1994 | (JP) . |
| WO 96/34064 | 10/1996 | (WO) . |

OTHER PUBLICATIONS

"Standard Recommended Practice for Determining Relative Stain Resistance of Plastics", *1992 Annual Book of ASTM Standards*, 1992, vol. 08.02, pp. 238–239.

"Recommended Practice for Determining Relative Stain Resistance of Plastics", *1969 Book of ASTM Standards*, Part 27, pp. 738–739.

H.C. Fielding, "Organofluorine Chemicals and their Industrial Applications", R.E. Banks, Ed., *Society of Chemical Industry*, 1979, p. 214.

E.P. Pleuddeman, "Silane Coupling Agents", Plenum Press: New York, 1982, pp. 20–23 and 97.

"Amino Resins and Plastics" Kirk–Othmer Encyclopedia of Chemical Technology, Wiley–Interscience, $3^{rd}$ Ed., vol. 2, 1978, pp. 440–469.

S. Sterman et al., "Theory of Mechanisms of Silane Coupling Agents in Glass Reinforced and Filled Thermoplastic and Thermosetting Resin Systems", Union Carbide Corporation, New York, pp. 1–25.

"A Guide to Dow Corning Silane Coupling Agents", Dow Corning Corp., 1985, pp. 1–13.

* cited by examiner

*Primary Examiner*—Vivian Chen
(74) *Attorney, Agent, or Firm*—Kent S. Kokko

(57) ABSTRACT

A curable fluorine-containing coating composition comprising:

(i) an amino resin;

(ii) an addition fluoropolymer comprising a copolymer of a fluorinated monomer having a fluorocarbon group of at least 3 carbons, and a non-fluorinated monomer having a crosslinking group capable of reacting with said amino resin at elevated temperatures; and (iii) a hardening agent capable of crosslinking with said amino resin at elevated temperatures.

25 Claims, No Drawings

ABRASION AND STAIN RESISTANT CURABLE FLUORINATED COATING

FIELD OF THE INVENTION

This invention relates to fluorochemical compounds and compositions for use in providing repellent properties to a substrate material. In another aspect, this invention relates to fluorochemical compounds that contain moieties derived from amino resins. This invention also relates to fluorochemical compounds that impart properties such as soil- and abrasion-resistance when applied to substrate materials. In still another aspect, this invention relates to substrates that are treated with fluorochemical compounds.

BACKGROUND OF THE INVENTION

Organofluorine compounds or fluorochemicals are substances containing portions that are fluorocarbon in nature and have properties such as hydrophobicity, oleophobicity, and chemically inertness, and portions that are organic or hydrocarbon in nature and which may be chemically reactive in organic reactions. Some fluorochemicals are familiar to the general public, such as SCOTCHGARD brand carpet protector, which imparts oil and water repellency and stain- and soil-resistance to carpet. Other fluorochemicals have other industrial uses, such as reducing the surface tension of liquids, reducing evaporation and inflammability of volatile organic liquids, and improving the leveling of organic polymer coatings.

The utility of fluorochemicals as surface-active agents and surface-treating agents is due in large part to the extremely low free-surface energy of $C_6$–$C_{12}$ fluorocarbon groups, according to H. C. Fielding, "Organofluorine Compounds and Their Applications," R. E. Banks, Ed., Society of Chemical Industry at p. 214 (1979). Generally, the fluorochemicals described above are those which have carbon-bonded fluorine in the form of a monovalent fluoroaliphatic radicals such as a perfluoroalkyl groups, such as $C_nF_{2n+1}$, where n is at least 3 and the terminal group is trifluoromethyl.

SUMMARY OF THE INVENTION

The invention provides a curable fluorine-containing coating composition comprising (i) an amino resin, (ii) an addition fluorocopolymer and (iii) a hardening agent capable of crosslinking with said amino resin at elevated temperature.

The invention also provides a method of preparing a coated substrate comprising the steps of: (a) coating at least part of one surface of a substrate with the curable fluorine-containing coating composition comprising: (i) an addition fluorocopolymer, (ii) amino resin, and (iii) hardening agent; and (b) curing the coating until the desired level of cure is achieved This invention also provides coated substrates prepared in accordance with the aforementioned method.

DETAILED DESCRIPTION OF THE PREFERRED EMBODIMENTS OF THE INVENTION

The fluorocopolymer contains at least one, and preferably more than one, functional group that is capable of reacting or crosslinking with the amino resin (described in more detail below) at the cure conditions of the fluorine-containing coating composition.

Typically, such copolymers comprise interpolymerized units derived from fluorinated monomers, which may or may not contain moieties that are reactive with amino resins, and nonfluorinated amino resin crosslinking monomers (non-fluorinated monomers) each of which contains at least one moiety that is reactive with the amino resin at the cure conditions of the fluorine-containing coating composition. Generally the fluorocopolymer comprises a major amount of units derived from fluorinated monomers, relative to the amount of units derived from the nonfluorinated amino resin crosslinking monomers.

The fluorocopolymer contains a plurality of fluorocarbon groups each of which contains at least 3 carbon atoms. Preferably, the fluorocarbon groups are fluoroaliphatic groups and the average number of fluoroaliphatic groups in the fluorocopolymer is 2 to about 50. Most preferably, the average number of fluoroaliphatic groups in the fluorocopolymer is 20 to about 50. Generally, the fluorocopolymer contains from about 30 to about 80 weight percent fluorinated monomer, preferably from about 50 to about 75 weight percent based on the total weight of the fluorocopolymer. Preferably, essentially all of the fluorine in the fluorocopolymer is located in fluoroaliphatic groups.

Although the fluorinated monomer may contain moieties that can react with the amino resin at the coating composition cure conditions, such monomers are not generally used in the practice of the invention because it is preferable to react the fluorocopolymer to the amino resin through the functional groups on interpolymerized units derived from the amino resin crosslinking monomer or through the functional groups, if any, incorporated into the fluorocopolymer through the chain transfer agent (described in more detail below).

The fluorinated monomers useful in the invention are addition copolymerizable with the amino resin crosslinking monomer and any optional comonomer (described in more detail below) and contain at least one fluorocarbon group generally having at least three carbon atoms. Many such monomers and their methods of preparation are known and disclosed, e.g., in U.S. Pat. Nos. 2,803,615 (Ahlbrecht et al.) and 2,841,573 (Ahlbrecht et al.) which disclosures are incorporated herein by reference.

Examples of fluorinated monomers useful in this invention include the general classes of fluorochemical olefins such as acrylates, methacrylates, vinyl ethers, and allyl compounds containing fluorinated sulfonamido groups; acrylates or methacrylates derived from fluorochemical telomer alcohols or fluorochemical thiols, and the like. Preferred fluorinated monomers include N-methyl perfluorooctanesulfonamidoethyl acrylate, N-methyl perfluorooctanesulfonamidoethyl methacrylate, N-ethyl perfluorooctanesulfonamidoethyl acrylate, N-methylperfluorohexylsulfonamidoethyl acrylate, the reaction product of isocyanatoethylmethacrylate and N-methylperfluorooctanesulfonamidoethyl alcohol, perfluorooctyl acrylate, N-methyl perfluorooctanesulfonamidoethyl vinyl ether, and $C_8F_{17}SO_2NHCH_2CH=CH_2$, and others such as perfluorocyclohexyl acrylate, and tetrameric hexafluoropropylene oxide dihydroacrylate. A single type of fluorinated monomer or mixtures of various fluorinated monomers may be used to make the fluorocopolymer.

The amino resin crosslinking monomer can be any compound having a free radically polymerizable group capable of copolymerizing with the fluorinated monomer and, any optional comonomer, and a functional group capable of reacting with the amino resin at the coating cure conditions. Examples of such functional groups include carboxyl groups, amines, amides, epoxides, hydroxy groups and silane groups.

Generally the fluorocopolymer will comprise a minor amount of units derived from the amino resin crosslinking monomer. Preferably the fluorocopolymer contains from 5 to about 50 weight percent crosslinking monomer and most preferably 20 to 40 weight percent, based on the total weight of the fluorocopolymer.

Examples of amino resin crosslinking monomers include: N-methylol acrylamide; N-methylol methacrylamide; aziridinyl acrylate and methacrylate; diacetone acrylamide and methacrylamide; methylolated diacetone acrylamide and methacrylamide; 2-hydroxy-3-chloropropyl acrylate and methacrylate; hydroxy ($C_2$ to $C_4$) alkyl acrylates and methacrylates; maleic anhydride; allyl alcohol; allyl glycolate; isobutenediol; allyloxyethanol; o-allyl phenol; divinyl carbinol; glycerol α-allylether, acrylamide; methacrylamide; maleamide; maleimide; N-cyanoethyl acrylamide; N-isopropyl acrylamide; glyoxal bis-acrylamide; acrylic acid, methacrylic acid, and metal salts thereof; vinylsulfonic and styrene p-sulfonic acids and their metal salts; 3-aminocrotonitrile; monoallylamine; vinylpyridines; n-vinylpyrrolidone; 2-acrylamido-2-methylpropanesulfonic acid (AMPS) and its salts; vinyl azlactones; glycidylacrylate and methacrylate; allyl glycidyl ether; acrolein; methylaminoethyl acrylate and methacrylate; N-tert-butylaminoethyl methacrylate; allyl methacrylate; diallyl maleate; vinyltriethoxysilane; vinyltrichlorosilane; and the like.

A preferred class of amino resin crosslinking monomers is the class of unsaturated carboxylic acids represented by formula (I):

$$R^2R^1C=C(R^2)CO_2H \quad (I)$$

wherein the above formula, each $R^2$ can be independently selected and is either a hydrogen atom or a lower alkyl group and each $R^1$ can be independently selected and is a hydrogen atom, a lower alkyl group or a carboxyl group. Representative examples of such monomers include acrylic acid, methacrylic acid, crotonic acid, itaconic acid, maleic acid, fumaric acid.

Another preferred class of amino resin crosslinking monomers is the class of carboxyalkyl acrylates represented by formula (II):

$$CH_2=C(R^3)CO_2C_nH_{2n}CO_2H \quad (II)$$

wherein the above formula, each $R^3$ can be independently selected and is a hydrogen atom or a lower alkyl group, and n is a number from 2 to about 8. Representative examples of such monomers include 2-carboxyethyl (meth)acrylate, 2-carboxypropyl (meth)acrylate, 5-carboxypentyl (meth)acrylate.

A single amino resin crosslinking monomer or mixtures of amino resin crosslinking monomers may be used to make the fluorocopolymer.

Optionally, one or more other comonomers may be copolymerized with the fluorinated monomer and amino resin crosslinking monomer to make the fluorocopolymer. These monomers do not generally contain functional groups that will react with the amino resin at the coating cure conditions, but are generally selected to impart specific properties to the fluorinated copolymer. Generally the fluorocopolymer contains 20 weight percent or less of optional comonomers, based on the total weight of the fluorocopolymer, Examples of suitable optional comonomers include compounds in the general class of ethylenic compounds that are capable of free-radical polymerization such as: lower olefinic hydrocarbons which may be halogenated (e.g., ethylene, propylene, isobutene, 3-chloro-2-isobutene, butadiene, isoprene, chlorobutadiene, dichlorobutadiene, fluorobutadiene, difluorobutadiene, 2,5-dimethyl-1,5-hexadiene; vinyl, allyl or vinylidene halides (e.g., vinyl, vinylidene chloride, vinyl fluoride, vinylidene fluoride, allyl bromide, allyl chloride, methallyl chloride); styrene and its derivatives (e.g., vinyltoluene, α-methylstyrene, α-cyanomethylstyrene, divinylbenene, N-vinylcarbazole); vinyl esters (e.g., vinyl acetate, vinyl propionate, vinyl isobutyrate, vinyl succinate, vinyl stearate and divinylcarbonate); allyl esters (e.g., allyl acetate and allyl heptanoate); alkylvinyl ethers or alkylallyl ethers (e.g., cetyl vinyl ether, dodecyl vinyl ether, isobutyl vinyl ether, ethyl vinyl ether, 2-chloroethyl vinyl ether and tetrallyloxyethane); vinyl alkyl ketones (e.g., vinyl methyl ketone); unsaturated anhydrides and unsaturated esters (e.g., dimethyl maleate, ethyl crotonate, acid methyl maleate, acid butyl itaconate, vinyl acrylate, allyl acrylate, methyl acrylate, ethyl acrylate, butyl acrylate, isobutyl acrylate, hexyl acrylate, 2-ethylhexyl acrylate, chlorohexyl acryale, octyl acrylate, lauryl acrylate, stearyl acrylate and corresponding methacrylates); propyl trimethoxysilane; nitriles (e.g., acrylonitrile, methacrylonitrile, 2-chloroacrylonitrile, 2-cyanoethylacrylate methylene glutaronitrile, vinylidene cyanide; alkyl cyanoacrylates (e.g., isopropyl cyanoacrylate); (tris)-acryloyl-hexahydro-s-triazine; special acrylates such as butanediol dimethacrylate, dicyclopentenyl acrylate, ethoxylated bisphenol A dimethacrylate, isobornyl acrylate and methacrylate, trimethylolpropane triacrylate, allyl methacrylate; and di(meth)acrylates of glycols or polyalkylene glycols such as ethylene glycol dimethacrylate, and triethylene glycol acrylate.

The amount and type of amino resin crosslinking monomer and optional comonomer (if any) used to make the fluorocopolymer can be optimized in conjunction with the selection of the hardening agent (described in more detail below) to control the glossiness of the cured coating. Typically, this is accomplished by employing an amount and type of amino resin crosslinking monomer and/or optional comonomer that will either enhance the compatibility of the fluorocopolymer and hardening agent or decrease their compatibility. Generally, improvements in compatibility of these materials will lead to glossier coatings while a reduction in compatibility will lead to less glossy or matte finish coatings. Improved compatibility can be achieved by selecting amino resin crosslinking monomers and/or optional comonomers which are the same as, or similar in chemical structure to, the hardening agent. Conversely, a reduction in compatibility can be achieved by reducing or eliminating compatibility enhancing amino resin crosslinking monomers and/or optional comonomers or by incorporating amino resin crosslinking monomers and/or optional comonomers which will reduce the compatibility of the fluorocopolymer and hardening agent. For example, acrylic acid homopolymers and copolymers may be used as hardening agents in this invention. The use of acrylic acid amino resin crosslinking monomer to make the fluorocopolymer will improve its compatibility with the hardening agent. If a styrene copolymer hardening agent is employed (such as a styrene and allyl alcohol copolymer), styrene optional comonomer can be used to improve the compatibility of the fluorocopolymer and hardening agent. This effect is particularly useful in wall covering applications where matte finishes have heretofore been achieved by using protective coatings that contain fumed silica because silica can reduce the stain resistance and/or abrasion resistance of the protective top coating. Advantageously, the curable coating compositions of this invention can formulated to impart a matte finish to a substrate without the addition of silica by reducing the compatibility of the fluorocopolymer and hardening agent to produce a matte finish without silica. However, even though it is not preferred, matte finish coatings can be prepared according to this invention by adding fumed silica to the coating composition. The preparation of such coatings is discussed in more detail below.

Chain-transfer agent is desirably employed to terminate the fluorocopolymer chain at the proper length and control the absolute numbers of each type of monomer in the copolymer. Suitable chain-transfer agents contain a group capable of propagating and terminating a free-radical reaction and are well known to those skilled in the art, they may also contain one or more amino resin reactive groups. Representative chain transfer agents include non-functional thiols such as ethanethiol, propanethiol, butanethiol, n-octylthiol, t-dodecylthiol, 2-mercaptoethyl ether, 2-mercaptoimidazole, and the like. Functional chain-transfer agents, such as 3-thiopropionic acid, mercaptoethanol or mercaptopropanediol can be used to both control the molecular weight of the fluorocopolymer and to provide an additional crosslinking site for the amino resin. When employed, the chain-transfer agent should be used in an amount sufficient to control the number of polymerized units in the copolymer backbone. Typically, about 0.005 to about 0.05 equivalents, and preferably about 0.01 to about 0.02 equivalents, of chain transfer agent are used per total moles of fluorinated monomer, amino resin crosslinking monomer and optional comonomer used to make the fluorocopolymer.

The fluorocopolymer can be prepared by copolymerizing the fluorinated monomer, the amino resin crosslinking monomer and any optional comonomer in the presence of a free-radical initiator and the optional chain transfer agent. The free-radical initiator can be any of those compounds known in the art for use in free-radical polymerization reactions that provide initiating radicals upon homolysis. Representative examples of useful initiators include persulfates; organic azo compounds (e.g., azoisobutyronitrile and azo-2-cyanovaleric acid); organic peroxides (e.g., diacyl peroxides such as benzoyl peroxide and lauroyl peroxide and dialkyl peroxides such as di-t-butyl peroxide and dicumyl peroxide, and hydroperoxides such as cumene, t-butyl hydroperoxide, and t-amyl hydroperoxide); peroxyesters (e.g.,. t-butyl perbenzoate and di-t-butylperoxy phthalate), and the like.

The initiating radical formed by the initiator may be incorporated into the fluorocopolymer to varying degrees depending on the type and amount of initiator used in the reaction. It is preferred to use the initiator in an amount such that the molar ratio of initiator to monomers is between about 0.1 to about 5.0% by weight, more preferably between about 0.1 to about 0.8% by weight based on the total weight of all monomers used in the reaction.

The copolymerization reaction can be carried out in any solvent suitable for organic free-radical reactions. The reactants can be present in the solvent at any suitable concentration, e.g., from about 5 percent to about 90 percent by weight based on the total weight of the reaction mixture Examples of suitable solvents include aliphatic and alicyclic hydrocarbons (e.g., hexane, heptane, cyclohexane), aromatic solvents (e.g., benzene, toluene, xylene), ethers (e.g., diethylether, glyme, diglyme, diisopropyl ether), esters (e.g., ethyl acetate, butyl acetate), alcohols (e.g., ethanol, isopropyl alcohol), ketones (e.g., acetone, methylethyl ketone, methyl isobutyl ketone), sulfoxides (e.g., dimethyl sulfoxide), amides (e.g., N,N-dimethylformaide, N,N-dimethylacetamide), halogenated solvents such as methylchloroform, FREON brand 113 solvent available from DuPont, trichloroethylene, trifluorotoluene, and the like, and mixtures thereof.

The polymerization reaction can be carried out at any temperature suitable for conducting an organic free-radical reaction. Particular temperature and solvents for use can be easily selected by those skilled in the art based on considerations such as the solubility of reagents, the temperature required for the use of a particular initiator, and the like. While it is not practical to enumerate a particular temperature suitable for all initiators and all solvents, generally suitable temperatures are between about 30° C. and about 200° C.

Particularly preferred fluorocopolymers can be represented by formula (III), however, this formula is merely a representative structure and does not limit the particular order of the polymerized units in the structure. Although it is preferable that the fluorocarbon groups in the fluorocopolymer are located proximally to one another (e.g., on alternating carbon atoms of an aliphatic backbone, or occasionally on adjacent carbon atoms as distinct from isolated fluorocarbon groups distributed throughout the compound or fluorocarbon groups uniformly located on adjacent carbon atoms), the fluorocopolymer can be block, alternating or random polymeric structures.

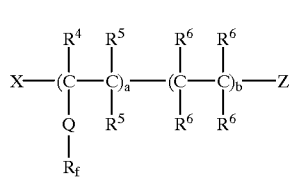

(III)

wherein, in formula (III):
    a and b are numbers greater than 1 and a+b is sufficient to render the fluorocopolymer polymeric. Typically, this means that the sum of a+b is at least about 100. Since the ratio of a to b will not be the same in each copolymer molecule of the fluorocopolymer, the ratio of a to b should be considered an overall average ratio for the fluorocopolymer. Preferably, the ratio of a to b is from 20:1 to about 1:1, preferably from about 10:1 to about 3:2, and most preferably about 3:1.

Each $R^4$ group can be independently selected and is a hydrogen atom, a halogen atom, or can be selected from the group consisting of straight or branched chain alkyl groups that contain 1 to about 4 carbon atoms.

Each $R^5$ group can be independently selected and is a hydrogen atom or a straight or branched chain alkyl group containing 1 to about 4 carbon atoms.

Each $R^6$ group can be either a hydrogen atom, a halogen atom, an organic group which is reactive with the amino resin at the coating cure conditions (e.g., carboxyl, amines, amides, epoxides, hydroxy groups siloxane and silane groups) or an organic group which is not reactive with the amino resin at the coating conditions (e.g., ether or ester group).

However, at least one of the $R^6$ groups must be a reactive group.

Each Q can be independently selected and is an organic linking group that Q links the fluoroaliphatic group, $R_f$, to the aliphatic backbone of the fluorocopolymer. Q preferably contains from 1 to about 20 carbon atoms and can optionally contain oxygen, nitrogen, sulfur, or silicon-containing groups or a combination thereof Preferably, Q is free of functional groups that substantially interfere with free-radical polymerization (e.g., groups containing polymerizable olefinic double bonds, thiol groups, and groups containing easily abstracted hydrogen atoms such as cumyl hydrogens). Examples representative Q groups are straight chain, branched chain, or cyclic alkylene groups, arylene groups, aralkylene groups, oxy, oxo, hydroxy, thio, sulfonyl, sulfoxy, amino, imino, sulfonamido, carboxamido, carbonyloxy, urethanylene and ureylene groups, and combinations thereof such as sulfonamidoalkylene. Preferred Q groups can be selected according to ease of preparation and commercial availability. Representative examples of Q groups include the following:

dently selected. It comprises a fully fluorinated terminal group such as —$(CF_2)_7CF_3$. $R_f$ is a stable, inert, nonpolar, preferably saturated moiety that is both oleophobic and hydrophobic. $R_f$ preferably contains at least about 3 carbon atoms, more preferably 3 to about 20 carbon atoms, and most preferably about 6 to about 14 carbon atoms. $R_f$ can contain straight chain, branched chain, or cyclic fluorinated alkylene groups or combinations thereof or combinations thereof with straight chain, branched chain, or cyclic alkylene groups. $R_f$ is preferably free of polymerizable olefinic unsaturation and can optionally contain catenary heteroatoms such as oxygen, divalent or hexavalent sulfur, or nitrogen. It is preferred that $R_f$ contain about 40% to about 78% fluorine by weight, more preferably about 50% to about 78% fluorine by weight. The terminal group preferably contains at least 7 fluorine atoms (e.g., $CF_3$ $CF_2CF_2$—, $(CF_3)_2CF$—, —$CF_2SF_5$, or the like). Perfluorinated aliphatic groups (i.e., those of the formula $C_nF_{2n+1}$) and perfluorinated aliphatic ether groups (i.e., those of the formula $C_nF_{2n}OC_nF_{2n+1}$) are the most preferred embodiments of $R_f$.

Z is a hydrogen atom, a residue of a chain transfer or a residue of a silane coupling agent.

The amino resin is any material in the broad class of materials based on the reaction of formaldehyde with urea, melamine, benzoguanamine, or acetylguanamine. Such compounds are well known and described in, for example, "Kirk-Othmer Encyclopedia of Chemical Technology", $3^{rd}$ Ed. Volume 2, pages 440–469, Wiley-Interscience, 1978. Representative examples of such compounds include methylolated melamines; benzoguanamines; acetylguanamines; methylolated ureas such as dimethylolurea, dimethylolethyleneurea, tetramethylolacetylene urea, and dimethylolpropyleneurea; dimethylol derivatives of tetrahydro-5-alkyl-S-triazone; glyoxal resins such as dimethyloldihydroxyethyleneurea (DMDHEU) and tetramethy-

TABLE A

| | | |
|---|---|---|
| —$SO_2NR^7(CH_2)_kO(O)C$— | —$CONR^7(CH_2)_kO(O)C$— | —$(CH_2)_kO(O)C$— |
| —$CH_2CH(OH)CH_2O(O)C$— | —$CH_2CH(OR^8)CH_2O(O)C$— | —$(CH_2)_kC(O)O$— |
| —CH=$CH(CH_2)_kO(O)C$— | $(CH_2)_kSC(O)$— | —$(CH_2)_kO(CH_2)_kO(O)C$— |
| —$(CH_2)_kS(CH_2)_kO(O)C$— | —$(CH_2)_k(OCH_2CH_2)_kO(O)C$— | —$(CH_2)_kSO_2(CH_2)_kO(O)C$— |
| —$(CH_2)_kSO_2NR^7(CH_2)_kO(O)C$— | —$(CH_2)_kSO_2$— | —$SO_2NR^7(CH_2)_k$— |
| —$OC_6H_4CH_2O(O)C$— | | |

In the Table A formulas, each k is a number from 1 to about 20 and can be independently selected, each $R^7$ can be independently selected and is a hydrogen atom, phenyl group, or alkyl group of 1 to about 4 carbon atoms, and each $R^8$ can be independently selected and is an alkyl group of 1 to about 20 carbon atoms.

The X group is derived from the portion of the free radical initiator that forms an initiating radical upon homolytic decomposition of the free-radical initiator.

Each $R_f$ is a fluoroaliphatic group and can be indepenlolglycoluril; methylated derivatives of any of the foregoing; and uron resins such as N,N'-bis(methoxymethyl)uron. Methylolacrylamide and methylolmethacrylamide are also included within the class of amino resins. It is preferable to use water insoluble amino resins in aqueous coating compositions of the invention because they will have a longer shelf life. Structures of representative amino resin residues as they would be found in the reaction product of the fluorocopolymer, amino resin and hardening agent are shown in Table B.

TABLE B

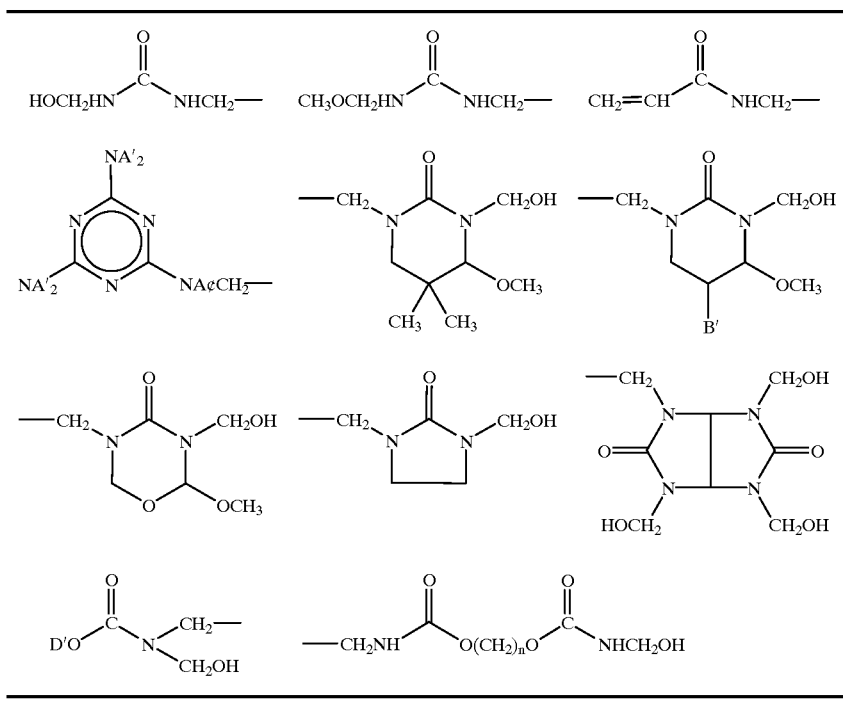

In the Table B structures, each A' moiety can be independently selected and can be a hydrogen atom, a hydroxymethyl group, or methoxymethyl group, each B' moiety can be independently selected and can be a hydrogen atom, hydroxyl group, or an alkyl group, each D' can be independently selected from the group consisting of alkyl, hydroxyalkyl, or alkoxyalkyl groups, and n is an integer from 1 to about 4. Also suitable are structures in which any or all of the hydroxymethyl or methoxymethyl groups are replaced by methylene groups.

The hardening agent can be a polymeric material that, increases the hardness and/or the abrasion resistance of the cured coating composition by increasing its glass transition temperature and/or increasing the crosslink density, relative to that of the fluorocopolymer/melamine reaction product at comparable weight ratios. Preferably, the hardening agent will increase the glass transition temperature of the cured coating composition to at least about 80° C. Alternatively, the hardening agent can be a material that increases hardness of the cured coating composition by increasing the crosslink density of the amino resin or between the amino resin and fluorocopolymer.

Generally, the amount of hardening agent is from about 10 to 80 weight percent, relative to the combined amounts of amino resin and fluorocopolymer. Preferably the amount of hardening agent is from 10 to 30 weight percent. Use of hardening agent in amounts greater than 50 weight percent produces hard, durable coatings, but the anti-stain or stain-release effects of the fluorocopolymer begins to diminish.

Examples of suitable hardening agents that increase the glass transition temperature of the cured coating composition include copolymers of lower alkyl methacrylates (wherein the lower alkyl group has 1 to about 3 carbon atoms); copolymers of lower alkyl methacrylates with cycloalkyl acrylates (wherein the cycloalkyl group contains 5 to 7 carbon atoms); copolymers of hard vinyl monomers (such as styrene and methyl styrene) with functional vinyl monomers (such as allyl alcohol); homopolymers of monomers containing groups that are reactive with the amino resin at coating cure temperatures (such as the carboxylic acids like acrylic, methacrylic, itaconic, maleic and crotonic acids); copolymers of functional monomers with monoalkyl esters of itaconic and maleic acids wherein the alkyl group has about 1 to 8 carbon atoms, methacrylonitrile, acrylamide, methacrylamide, and acrylonitrile.

The hardening agent may include minor amounts of addition-polymerizable fluoromonomers to increase the compatibility of the hardening agent with the fluorocopolymer, reduce haze and thus and render the coating more transparent. Typically such a hardening agent would contain from 0 to 25 weight percent of the fluoromonomer, preferably 0 to 20 weight percent. Greater amounts tend to reduce the Tg of the hardening agent and consequently the hardness of the cured coating.

Examples of suitable hardening agents that function by increasing the crosslink density of the cured coating include polyols (such as propanediol, 2,2-dimethylpropanediol, trimethanolpropane), epoxy resins, novolac resins, polyamines and diamines such as diaminodiphenylsulfone.

A single hardening agent or combination of hardening agents may be used to make the coating composition. If a more flexible coating is desired, polyester polyol and urethane diol hardening agents can be used alone or in conjunction with other hardening agents. Relatively small concentrations of these materials can increase the flexibility of the cured coating without sacrificing hardness, and can improve the adhesion of the cured coating to plastic substrates and improve the film-forming properties of the coating. Typically, amounts of no more than 20 percent of the total weight of hardening agent used to make the coating composition is necessary to improve coating flexibility.

Polyester polyols are sometimes preferred over styrene homo- or copolymers hardening agents because they yellow less. Urethane diol hardening agents are particularly useful in aqueous coating compositions because they improve the stability and uniformity of coating compositions which are aqueous dispersions of reaction products made from fluorocopolymer, amino resin and hardening agent. The use of urethane diol hardening agents also promote stable dispersions or solutions of otherwise water-insoluble amino resins.

Useful commercially available polyester polyols include those sold under the K-FLEX brand by King Industries of Norwalk, Conn. Useful commercially available urethane diols include those sold under the UD-320 brand by King Industries of Norwalk, Conn.

Preferably the coating composition is prepared by reacting the fluorocopolymer, amino resin, hardening agent and optional additional ingredients under dry conditions either neat or in a solvent with a boiling point higher than that of the by-product formed by the displacement of hydroxyl or alkoxy from an amino resin (i.e., water or an alcohol). Butyl acetate, methyl isobutyl ketone, trifluorotoluene and the like are suitable solvents. Suitable reaction temperatures will be easily determined by those skilled in the art based on the particular reagents and solvents being used and the particular by-products formed in the reaction. While it is not practical to enumerate particular temperatures suitable for all situations, generally suitable temperatures are between about 80° C. and about 200° C. Reduced pressure can also be used to remove by-products.

Preferably catalysts are employed in the reaction. For example, under suitable conditions, acidic catalysts such as p-toluenesulfonic acid, sulfuric acid, or the like can be used, and certain organotitanates are useful. Preferred acid catalysts include the "blocked acid" catalysts in which an acid catalyst is coupled to a blocking agent such as an amine, which disassociates at a known, elevated temperature to provide an active catalyst. The use of such "blocked acid" catalysts permits the incorporation of the acid catalyst into the coating composition without premature curing and preparation of coating compositions having a long "shelf life". The coating composition can be prepared and stored for long periods but will not begin to cure until exposed to the elevated temperatures necessary to effect curing. Examples of such catalysts include the K-KAT, NACURE and K-CURE brand blocked acid catalysts commercially available from King Industries, Norwalk, Conn. The amount of catalyst employed in the reaction will affect the temperature at which curing will commence, however, cure temperatures are preferably about 60° C. or more. Another useful class of acid catalyst are UV activated Lewis acid catalysts which on exposure to UV light generate an acid catalyst. This class is particularly useful when coating and subsequently curing heat sensitive substrates. Such catalysts are available as UVOX brand catalysts from CIBA-Geigy.

Generally, coating compositions cured at elevated temperatures exhibit better repellency properties than coating compositions cured at lower temperatures. While not wishing to be bound by theory, it is believed that the use of higher temperature cure conditions allow the fluorinated moiety of the fluorocopolymer to orient or "bloom" to the surface during the cure conditions.

The weight ratio of the amino resin to the fluorocopolymer is typically in the range of 95:5 to 60:40, preferably 90:10 to 70:30. It is preferred for reasons of cost that the amount of fluorochemical copolymer be kept to a minimum, while still providing the coating with good stain and solvent resistance. Further, it has been found that the solvent resistance begins to diminish at fluorochemical copolymer levels below 10 wt. %.

The hardness of the coating composition can be enhanced by the addition of hard fillers such as colloidal silica, alumina powder or glass or ceramic bubbles. Preferably, such materials are mixed with the fluorocopolymer, amino resin and hardening agent before the coating composition is cured. After curing, the coating composition and hard fillers form a composite material. Where colloidal silica is employed, a silane coupling agent is preferably also added to the coating composition prior to curing to enhance adhesion between the reacted fluorocopolymer, amino resin and hardening agent and the filler.

Silane coupling agents comprise compounds having at least one hydrolyzable silane moiety and at least one polymerizable moiety. The polymerizable moiety preferably contains either (meth)acrylate, allyl, styryl, amino or epoxy functionalities, while the hydrolyzable silane moiety is usually an alkoxy silyl moiety (generally either ethoxy or methoxy) which serves as a binding site to hydroxy functional inorganic substrates via displacement of the alkoxy groups. Such materials are described in E. P Pleuddeman *Silane Coupling Agents*, Plenum Press: New York, 1982, pp. 20–23 and 97 as well as in technical reports by S. Sterman and J. G Marsden entitled "Theory of Mechanisms of Silane Coupling Agents in Glass Reinforced and Thermosetting Resin Systems", Union Carbide Corp., New York, and "A Guide to Dow Corning Silane Coupling Agents", Dow Corning Corp., 1985, pp. 2–13, the disclosure of which are incorporated by reference herein. Typically, about 3 to 5 parts by weight of silane coupling weight for every 100 parts by weight of fluorocopolymer employed in the composition is adequate.

If desired, various other ingredients known for use in coating compositions may be incorporated into the coating composition prior to curing. For example, pigments or dyes may be incorporated in order to provide a colored coating. Solvents, or other viscosity modifiers, may also be added to adjust the viscosity of the curable coating composition. Various conventional leveling agents may also be added to the coating composition. These may be useful in producing a high quality coatings. Furthermore, various accelerators may be added to the compositions in order to speed the curing process.

Solvents may be added to the curable coating composition to reduce the viscosity of the compositions. Examples of useful solvents include: lower alcohols; halogenated hydrocarbon solvents; ketones; aromatic solvents; fluorinated ethers in which one or more hydrogen atoms of an ether has been replaced by a fluorine atom; hydrofluorocarbon solvents (i.e., compounds having only carbon, fluorine and hydrogen atoms); and water. However if water is added to the coating composition, the reaction product of the fluorocopolymer, amino resin and hardening agent should be treated with an organic or inorganic base to neutralize any unreacted carboxylic acid groups and render the product more water-soluble or water-dispersible. When water is used as a solvent, the fluorocopolymer may contain greater amounts of the amino resin crosslinking monomer to render the fluorocopolymer more water soluble or water dispersible.

The amount of solvent added to the composition is dependent upon the solids content or viscosity of the coating composition desired and it is well within the abilities of one of ordinary skill in the art to vary the amount of solvent and other coating composition components to achieve the desired result. In some cases, more aggressive solvents can be used to enhance the adhesion of the coating to certain substrates. For example, methyl ethyl ketone can enhance adhesion to vinyl substrates. Representative examples of useful organic solvents include ethanol, methanol, isopropanol, tert-butanol, chloroform, methylene chloride, toluene, benzene, xylene, trichloroethane, 1,2-dichloroethane, acetone and methyl ethyl ketone. The fluorinated ethers possess good solvent properties as well as exceptional chemical and thermal stability. Since they lack chlorine atoms, they have a zero ozone depletion potential and therefore do not contribute to global warming. A preferred class of fluorinated ethers are the alkoxy-substituted perfluorolkanes described in WO 96/22356.

The curable coating composition can be applied to a wide variety of substrates to impart abrasion resistance, solvent resistance, and repellency, as well as to impart anti-staining and anti-soiling characteristics to the surface. In general, the type of substrates that can be coated include both rigid and flexible substrates such as: plastics, glass, metal, wood and ceramics. Representative examples of substrates that can be coated with the coating composition include: lenses used in ophthalmic spectacles, sunglasses, optical instruments, illuminators, watch crystals, and the like; plastic window glazing; signs and decorative surfaces such as wallpaper and vinyl flooring; and composite or laminated substrates such as FORMICA brand sheeting or laminated flooring (e.g., PERGO brand flooring). Since coatings prepared from the curable coating composition can render metal surfaces resistant to soils, the optical properties of metal surfaces like those on decorative metal strips and mirrors can be preserved longer. The coating composition can make wood surfaces more resistant to food and beverage stains while providing a lustrous appearance. In addition, the coating composition can be applied as a protective coating on aircraft (in deicing wings), on boat hulls and other surfaces exposed to marine environment as anti-fouling coatings, as automotive polish, as automotive topcoat, and as automotive transit coating. It can also be used on concrete, fishing line, medical surfaces, siding, sinks, showers, vinyl flooring, and wallcovering; and can be used in food release, mold release, adhesive release applications, and the like.

A preferred substrate is a wallcovering sheet which typically comprises a backing layer of paper, or other suitable material, a surfacing layer to impart an ink receptive surface to the sheet and optionally, a polyvinyl chloride plastisol or a polyvinyl chloride and acrylic copolymer layer. A description of wallcoverings and their manufacture can be found in U.S. Pat. No. 4,804,572 (Bodrogi), herein incorporated by reference. After curing, the coating composition of this invention can provide a stain-resistant, durable, matte finish coating to wallcoverings.

The curable coating composition can be applied to a substrate using any conventional technique. For example, the composition can be brushed or sprayed (e.g., as an aerosol) onto a substrate, or the substrate can be immersed in the coating composition or can be spin-coated. When coating flat substrates, it is preferable to knife-coat or bar-coat the substrate to ensure uniform coatings.

The coating compositions can be applied to a substrate in any desired thickness. It has been found that coatings as thin as a few microns offer excellent abrasion resistance and low surface energy. However, thicker coatings (e.g., up to about 20 microns or more) can be obtained by applying a single thicker coating or by applying successive layers of the coating to the substrate. The latter can be done by applying a layer of the coating composition to the substrate and then drying without extensive curing, for example, by heating the coated substrate for about one minute at about 60° C. Successive layers of the coating can then be applied to dried, but uncured, coatings. This procedure can be repeated until the desired coating thickness is obtained and then the coated substrate is cured at elevated temperature to the desired level. It is particularly advantageous to cure the coating at elevated temperatures (i.e., greater than about 60° C.) in order to achieve the optimum water repellency properties.

The curable coating composition of this invention is especially useful as a wallcovering coating because the curable coating composition can be applied to the wallcovering sheet after the wallcovering is printed, and heated slightly to remove any solvent in the coating composition. The result is a uncured or partially cured, non-tacky, protective coating that is relatively flexible and conveniently permits further handling of the wallcovering until it is time to finish the cure, for example by embossing with heated rollers.

EXAMPLES

Unless specified to the contrary, all parts are parts by weight.

The following abbreviations are used in the Examples:

| | |
|---|---|
| A174 | Trimethoxysilylpropylmethacrylate commercially available from United Chemical Technologies Inc as A-174 silane coupling agent |
| AA | Acrylic acid |
| AQ 7550 | A partially methoxylated melamine 80% solids in water/ethanol, commercially available from Solution Inc, St. Louis, MO as Resimine AQ-7550 |
| EtFOSEA | N-ethylperfluorooctylsulfonamidoethyl acrylate |
| EtFOSEMA | N-ethylperfluorooctylsulfonamidoethyl methacrylate |
| HEMA | Hydroxyethyl methacrylate |
| IBuMeA | Isobutyl methacrylate |
| KF-2001 | A mercaptopropyl grafted dimethylpolysiloxane oligomer, commercially available from Shin-Etsu Silicones of America as KR-2001 silane coupling agent |
| MeFOSEA | N-methylperfluorooctylsulfonamidoethyl acrylate |
| MIBK | Methyl isobutyl ketone |
| MMA | Methyl methacrylate |
| MPA | Mercaptopropionic acid |
| MPD | Mercaptopropanediol |
| MPE | Mercaptoethanol |
| Novolac 438 | An epoxy Novolac resin, available from Dow Chemical |
| NVP | N-vinyl pyrrolidone |
| OHM 747 | A mixture of 1 part by weight of a melamine and 2 parts by weight of a ETFOSEA/MMA/AA (23/60/17) copolymer hardening agent. The melamine is commercially available from Solutia as RESIMINE brand 747 melamine. |
| PEGDA | A polyethylene glycol dicarboxylic acid hardening agent |
| PGMME | Polyethylene glycol monomethyl ether |
| Res 2040 | A mixture of a modified high solids hexamethoxymethyl melamine (60 wt. %) and a styrene/allyl alcohol copolymer hardening agent (40 wt. %) that is commercially available from Solutia as RESIMINE brand 2040 melamine. |
| Res 747 | A hexamethoxymethyl melamine commercially available from Solutia as RESIMINE brand 747 melamine. |
| Res 797 | A mixture of a melamine (80 wt. %) and a styrene/allyl alcohol copolymer hardening agent (20 wt. %) that is commercially available as RESIMINE brand 797 melamine from Solutia. |
| SMA | A stearyl methacrylate |
| Zonyl TAN | $C_8F_{17}CH_2CH_2O(CO)CH=CH_2$ that is commercially available from DuPont as ZONYL brand. |
| Zonyl TM | $C_8F_{17}CH_2CH_2O(CO)CCH_3=CH_2$ that is commercially available from DuPont as ZONYL brand. |
| AIBN | Azobisisobutyronitrile |

Examples 1–45

Preparation of the Fluorocopolymer.

To a glass bottle was added the following: 3 g of chain transfer agent (MPA), 5 g of MPA amino resin crosslinking monomer, 30 g of AA amino resin crosslinking monomer, 20 g of styrene optional comonomer, and 52 g of EtFOSEA fluorinated monomer, 0.6 g AIBN initiator, and 257 g of isopropanol solvent. The resulting mixture was swirled to form a uniform solution and purged for 4 min by bubbling nitrogen through the solution. The solution was agitated at 75° C. for 8.5 hours. A uniform yellowish solution was observed. A determination of the solid residue remaining following the evaporation of a weighed sample of the reacted solution gave a value of 23%, indicating that most of the monomer reacted.

Preparation of the Reaction Product of the Fluorocopolymer, Amino Resin and Hardening Agent.

A 13.6 g sample of the fluorocopolymer (13.6 g) prepared above was reacted with 14.1 g of RES 2040 (a mixture of an amino resin and hardening agent). The resultant mixture was diluted with isopropanol (15.1 g) to 35 wt. % solids. The final mixture was shaken to form the stable, thermally curable coating composition. Using this general procedure, other coating compositions were prepared using various fluorocopolymers, amino resins, hardening agents and solids levels.

Comparative Example 1

Preparation of the Reaction Product of an Oligomeric Fluorocopolymer and Amino Resin For comparative purposes, an oligomeric fluorochemical corresponding to intermediate 16 of U.S. Pat. No. 5,292,796 was prepared using the general procedure described for intermediate I1 using the monomers and amounts shown in Table 1. This oligomeric fluorochemical was further reacted with an equimolar amount of Res 747 by heating at 160° C. until no further methanol distilled from the reaction vessel. As in the previous Examples, a sample of the fluorochemical oligomer/melamine reaction product was diluted with isopropanol to 35% solids, and coated with a #6 coating bar onto a calendered, corona-treated polyvinyl chloride paper surfacing composition and cured for 15 minutes at 130° C.

In testing the stain resistance of the coated, cured article, it was noted that the composition provided poor stain resistance as shown in Table 4. In testing the surface repellency, the coating was very soft, non-durable and was easily removed by wiping with a paper towel. Taber abrasion data could not be collected for the same reason.

TABLE 1

| Example | Fluorocopolymer Composition (Monomers) | Monomer Weight Ratios | Amino Resin | Weight Ratio Amino Resin to Fluorocopolymer | Total Solids (%) and Solvent |
|---|---|---|---|---|---|
| 1 | ETFOSEA/AA/Styrene/A174/MPA | 52/30/20/5/3 | Res 2040 | .25 | 35 |
| 2 | ETFOSEA/AA/Styrene/A174/MPA | 62/20/20/5/3 | Res 2040 | 0.25 | 35 |
| 3 | ETFOSEA/AA/Styrene/A174/MPA | 72/20/10/5/3 | Res 2040 | 0.25 | 35 |
| 4 | ETFOSEA/AA/Styrene/A174/MPA/SMA | 57/20/5/5/3/10 | Res 2040 | 0.25 | 35 |
| 5 | ETFOSEA/AA/A174/MPA/SMA | 62/20/5/3/20 | Res 2040 | 0.25 | 35 |
| 6 | ETFOSEA/AA/A174/MPA/SMA | 52/30/5/3/20 | Res 2040 | 0.25 | 35 |
| 7 | ETFOSEA/MMA/AA/A174/MPA | 62/20/20/5/3 | Res 2040 | 0.25 | 35 |
| 8 | ETFOSEMA/Zonyl TAN/AA/A174/MPA | 36/36/30/5/3 | Res 2040 | 0.35 | 35 |
| 9 | ETFOSEMA/Zonyl TAN/AA/A174/MPA | 36/36/30/5/3 | Res 2040 | 1.05 | 35 |
| 10 | ETFOSEA/AA/A174/MPA | 72/30/5/3 | Res 2040 | 0.35 | 35 |
| 11 | ETFOSEA/MMA/AA/A174/MPA | 62/10/30/5/3 | Res 2040 | 0.35 | 35 |
| 12 | ETFOSEA/MMA/AA/A174/MPA | 62/10/30/5/3 | OHM747 | 0.35 | 35 |
| 13 | ETFOSEA/MMA/AA/A174/MPA | 62/20/20/5/3 | Res 2040 | 0.35 | 35 |
| 14 | ETFOSEA/MMA/AA/A174/MPA | 62/20/20/5/3 | OHM 747 | 0.35 | 35 |
| 15 | ETFOSEA/Zonyl TAN/AA/MPA | 20/40/30/5/3 | Res 2040 | 0.35 | 35 |
| 16 | ETFOSEA/Zonyl TAN/AA/MPA | 20/40/30/10 | OHM 747 | 0.35 | 35 |
| 17 | ETFOSEA/AA/MPA | 60/30/10 | Res 2040 | 0.35 | 35 |
| 18 | ETFOSEMA/Zonyl TAN/AA/A174/MPA | 36/36/30/5/3 | Res 2040 | 0.35 | 35 IPA |
| 19 | ETFOSEMA/Zonyl TAN/AA/A174/MPA | 36/36/30/5/3 | Res 2040 | 1.06 | 35 IPA |
| 20 | ETFOSEA/AA/A174/MPA | 72/30/5/3 | Res 2040 | 0.35 | 35 IPA |
| 21 | ETFOSEA/MMA/AA/A174/MPA | 62/10/30/5/3 | Res 2040 | 0.35 | 35 IPA |
| 22 | ETFOSEA/MMA/AA/A174/MPA | 62/10/30/5/3 | OHM 747 | 0.35 | 35 |
| 23 | ETFOSEA/MMA/AA/A174/MPA | 62/20/20/5/3 | Res 2040 | 0.35 | 35 |
| 24 | ETFOSEA/MMA/AA/A174/MPA | 62/20/20/5/3 | OHM 747 | 0.35 | 35 |
| 25 | ETFOSEA/Zonyl TAN/AA/MPA | 20/40/30/5/3 | Res 2040 | 0.35 | 35 |
| 26 | ETFOSEA/Zonyl TAN/AA/MPA | 20/40/30/10 | OHM 747 | 0.35 | 35 |
| 27 | ETFOSEA/AA/MPA | 60/30/10 | Res 2040 | 0.35 | 35 |
| 28 | ETFOSEA/AA/MPA | 60/30/10 | OHM 747 | 0.35 | 35 |
| 29 | ETFOSEA/MMA/AA/MPA | 60/10/25/5 | Res 2040 | 0.35 | 35 |
| 30 | ETFOSEA/MMA/AA/MPA | 60/10/25/5 | OHM 747 | 0.35 | 35 IPA |
| 31 | ETFOSEA/MMA/AA/MPA | 50/20/25/5 | Res 2040 | 0.35 | 35 IPA |
| 32 | ETFOSEA/MMA/AA/MPA | 50/20/25/5 | OHM 747 | 0.35 | 35 |
| 33 | EtFOSEMA/Zonyl/AA/A174/MPA | 36/36/30/5/4/3 | Res 797 | 3 | 40 |
| 34 | EtFOSEMA/AA/A174/MPA | 72/30/5/3 | Res 797 | 3 | 40 |
| 35 | MeFOSEA/AA/A174/MPA | 72/30/5/3 | Res 797 | 3 | 40 |
| 36 | MeFOSEA/AA/A174/MPA | 72/30/5/3 | Res 2040 | 1 | 40 |
| 37 | EtFOSEMA/AA/A174/MPA | 72/30/5/3 | Res 2040 | 3 | 40 |
| 38 | ETFOSEA/AA/A174/MPA | 72/30/5/3 | Res 797 | 3 | 40 |
| 39 | ETFOSEA/AA/A174/MPA | 72/30/5/3 | Res 797 | 1 | 40 |
| 40 | MeFOSEA/MAA/A174/MFA | 72/30/5/3 | Res 797 | 3 | 40 |
| 41 | ETFOSEA/AA/A174/MPA/Styrene | 67/30/5/3/5 | Res 797 | 3 | 40 |
| 42 | ETFOSEA/AA/A174/MPA/Styrene | 67/30/5/3/5 | Res 797 | 1 | 40 |
| 43 | EtFOSEMA/ZonylTM/AA/A174/MPA | 36/36/30/5/3 | Res 2040 | 1 | 40 |
| 44 | MeFOSEA/MAA/SMA/A174/MPA | 62/30/10/5/3 | Res 797 | 1.85 | 40 |
| 45 | EtFOSEA/MMA/AA/MPA | 60/10/25/5 | Res 797 | 0.35 | 40 |
| 46 | ETFOSEA/AA/KF-2001/A174/NVP | 60/20/20/3/5 | AQ7550 | .35 | 40 (water) |
| Comparative 1 | MeFOSEA/IBuMeA/MPE | 3.1/0.8/1.0 | Res 747 | | 40 |

Examples 47 to 49

Using essentially the procedure described above in Examples 1–45, fluorocopolymers were prepared, blended and reacted with amino resin. The amounts and types of monomers, fluorinated copolymers and amino resins are described in Table 2. The final coating compositions were adjusted to 40 wt. % solids by addition of ethanol.

TABLE 2

| Example | Fluorinated Copolymer 1 (Monomers, Monomer Amounts and Copolymer Amount) | Fluorinated Copolymer 2 (Monomers, Monomer Amounts and Copolymer Amount) | Amino Resin (Type & Amount) | Solids Ratio |
|---|---|---|---|---|
| 47 | EtFOSEA/MMA/HEMA/MPD 60/20/17/3 1.5 parts | EtFOSEA/MMA/HEMA/MPE 20/60/15/5 3 parts | Res 747 29.4 parts | 0.13 |
| 48 | EtFOSEA/MMA/HEMA/MPD 60/20/17/3 3 parts | EtFOSEA/MMA/HEMA/MPE 20/60/15/5 6 parts | Res 747 14.7 parts | 0.38 |
| 49 | EtFOSEA/MMA/HEMA/MPD 60/20/17/3 16.4 parts | EtFOSEA/MMA/HEMA/MPE 20/60/15/5 7.1 parts | Res 747 21.6 parts | 0.52 |

Examples 50 to 58

Using the general procedure of Example 1, coating formulations were prepared using the fluorocopolymers, amino resins and solvents noted in Table 3 The formulations were diluted to 35 to 40 weight percent solids, then coated on calendered, polyvinyl chloride coated wallpaper stock with an acrylic primer and heated to removed solvent. Some of the samples were then evaluated for abrasion resistance using the Tabor Abrasion Test (i.e., ASTM D 1044-90) for 100 cycles under a 500 g load. Coated samples were also cured by calendering at 145° C. and the abrasion resistance of the cured coating was again measured using the Tabor Abrasion Test for 100 cycles under a 500 g load.

For comparative purposes, a sample of wallpaper stock lacking the coating of this invention was subjected to the Tabor Abrasion Test and experienced a weight loss of 0.034 g (control). The fluorinated copolymers, coatings and abrasion resistance of these coating is summarized in Table 3. As can be seen from the abrasion test data, the coatings of the present invention show good abrasion resistance as compared to the control.

TABLE 3

| Example | Fluorocopolymer (Monomers, monomer weight ratios, weights used) | Amino resin (weights used) | Hardening agent (weight used) | Solvent | Wt loss (g) |
|---|---|---|---|---|---|
| 50 | MEFOSEA/MMA/AA/A174/MPA 62/10/30/5/3 2.9 g solids, 12.1 g soln | RES 2040 8.5 g solids, 10 g soln | PEGDA 1.12 g | MIBK | n/a |
| 51 | ETFOSEA/MMA/AA/A174/MPA 62/20/20/5/3 2.9 g solids, 12.1 g soln | OHM 747 8.8 g solids, 17.3 g soln | PEGDA 3.5 g | MIBK | n/a |
| 52 | ETFOSEA/MMA/AA/MPA 62/10/25/5/3 3 g solids, 10 g soln | Res 797 8.5 g solids, 9.2 g soln | PEGDA 3.5 g | MIBK | n/a |
| 53 | ETFOSEA/MMA/HEMA/MPD 60/20/17/3 16.4 g solids, 54.6 g soln. | Res 747 21.6 g solids, 22 g soln | ETFOSEA/MMA/ HEMA/MPD 7.1 g solids, 23.6 g soln and PEGDA 8.2 g | MIBK | n/a |
| 54 | ETFOSEA/AA/MPA 60/37/3 3 g solids, 8.6 g soln | Res 747 13.8 g solids 14.1 g soln | | MIBK | n/a |
| 55 | MEFOSEA/AA/Styrene/A174 94/54/40/12, 10 g (s), 34.5 g (soln) | Res 747 24 g (s), 24.5 g (soln) | 16 g 2,2-Dimethylpropanediol | 107.7 g MEK/PGMME | 0.022 |
| 56 | MEFOSEA/AA/Styrene/A174 94/54/40/12, 10 g (s), 34.5 g (soln) | Res 747 24 g (s), 24.5 g (soln) | 16 g Trimethanolpropane | 107.7 g MEK/PGMME | 0.025 |
| 57 | MEFOSEA/AA/Styrene/A174 94/54/40/12, 10 g (s), 34.5 g (soln) | Res 747 24 g (s), 24.5 g (soln) | 16 g Diaminodiphenylsulfone | 107.7 g MEK/PGMME | 0.020 |
| 58 | MEFOSEA/AA/Styrene/A174 94/54/40/12, 10 g (s), 34.5 g (soln) | Res 747 24 g (s), 24.5 g (soln) | 16 g Novolac 438 epoxy resin | 107.7 g MEK/PGMME | 0.012 |
| Control | None | None | None | None | 0.034 |

Some of the curable coating compositions described in Tables 1 to 3 were evaluated for stain resistance after they were coated on a vinyl wallcovering and cured. The compositions were combined with 3 wt. % methanesulfonic acid or p-toluenesulfonic acid and coated onto a vinyl wallcovering with a polyvinyl chloride plastisol paper surface using a Meyer bar coater to a coating thickness of 0.25 mils. The coated wallcovering was then cured at 105–110° C. for one minute. Strips of the coated wallpaper were then tested for stain resistance according to ASTM D2299-68, in which a sample of a staining material (e.g., lipstick, mustard, ketchup, AFROSHEEN brand hair treatment) is applied to a test strip, aged for twenty four hours and then cleaned with the following cleaning agents in sequential order:

1) soapy water,
2) Pine-Sol brand cleaner (commercially available from Clorox Company), and 3) isopropanol.

The appearance of the stain remaining on the test strip after cleaning is compared to a control (uncoated test strip) evaluated and ranked according to the following scale.

0 no visible stain, 1 slight stain, 2 moderate stain 3 severe stain

A "–" indicates that the particular staining material was not evaluated.

taken to insure that the surface is clean and dry. Extremes in temperature or relative humidity which may affect the adhesion of the tape or the coating should be avoided. Two sets of three parallel cuts each, with cuts one set being at 90° to cuts in the other set, are made in the coating, each about 20 mm long so as to intersect near the middle of the test panel. The cut should penetrate through the coating to the substrate in one steady motion. The substrate should be visible through the coating. After cutting, the film is lightly brushed to remove detached flakes or ribbons of coatings. A piece of tape 75 mm long is removed from the roll and

TABLE 4

| Sample No. | Lipstick | Ballpoint pen | Magic Marker | Mustard | Ketchup | Black Shoe Polish | Brown Shoe Polish | Red Crayon | Tea | Coffee | Betadine | Spray paint | AFRO-SHEEN |
|---|---|---|---|---|---|---|---|---|---|---|---|---|---|
| 1 | 0 | 0 | 0 | 0 | 0 | 2 | 2 | 0 | 0 | 0 | 2 | 0 | 0 |
| 3 | 0 | 0 | 0 | 0 | 0 | 2 | 2 | 0 | 0 | 0 | 2 | 0 | 0 |
| 4 | 0 | 0 | 0 | 2 | 0 | 2 | 2 | 0 | 0 | 0 | 2 | 0 | 0 |
| 5 | 0 | 0 | 0 | 2 | 0 | 2 | 2 | 0 | 0 | 1 | 2 | 0 | 0 |
| 6 | 0 | 0 | 0 | 2 | 0 | 2 | 2 | 0 | 0 | 1 | 2 | 0 | 0 |
| 7 | 0 | 0 | 0 | 0 | 0 | 2 | 2 | 0 | 0 | 0 | 2 | 0 | 0 |
| 14 | 0 | 0 | 2 | 2 | 0 | 2 | — | 0 | 0 | 0 | 0 | 2 | — |
| 16 | 0 | 0 | 0 | 2 | 0 | 2 | — | 0 | 0 | 0 | 1 | 2 | — |
| 43 | 0 | 0 | 1 | 1 | 0 | 2 | 2 | 0 | 0 | 0 | 2 | 2 | 0 |
| 51 | 0 | 0 | 2 | 0 | 0 | 2 | 2 | 0 | 0 | 0 | 2 | 0 | 0 |
| 50 | 2 | 1 | 2 | 2 | 0 | 2 | — | 0 | 1 | 2 | 2 | 2 | — |
| 15 | 2 | 1 | 2 | 2 | 1 | 2 | — | 0 | 2 | 2 | 2 | 2 | — |
| 17 | 2 | 1 | 2 | 2 | 1 | 2 | — | 0 | 1 | 2 | 2 | 2 | — |
| 51 | 2 | 2 | 2 | 2 | 1 | 1 | — | 1 | 2 | 2 | 2 | 2 | — |
| 55 | 1 | 1 | 1 | 1 | 1 | 1 | 2 | 1 | — | — | 3 | — | — |
| 56 | 1 | 1 | 1 | 1 | 1 | 1 | 3 | 1 | — | — | 3 | — | — |
| 57 | 2 | 2 | 2 | 2 | 2 | 3 | 3 | 3 | — | — | 3 | — | — |
| 58 | 1 | 1 | 1 | 1 | 1 | 1 | 1 | 1 | — | — | 3 | — | — |
| C-1 | na | na | 3 | 3 | na | 3 | na | na | na | na | na | na | na |

Examples 59–65

In the following Examples, coating compositions were prepared using the general procedure of Example 1, using a polyester polyol to promote flexibility of the coating (K-FLEX™ 188 from King Industries) and a plasticizer as shown in the following Table 5. The coating composition used was:

MeFOSEA/AA/Styrene/A174/MPA (47.3/27.3/18.2/5.4/2.0)

The samples were coated on vinyl wallpaper stock, cured at 140° C. and tested for adhesion by the crosshatch test. The test is that described in ASTM D 3359-78-B entitled Standard Methods for Measuring Adhesion by Tape Test. The test method assesses the adhesion of coating films to substrates by applying and removing pressure sensitive adhesive tape over cuts made in a film of the coating composition. A crosshatch pattern with 3 cuts in each direction is then made in the coating to the substrate, pressure-sensitive adhesive tape is applied over the crosshatch and removed, and adhesion is evaluated by comparison with descriptions and illustrations. The cutting tool is a sharp razor blade, scalpel, knife or other cutting device which has a cutting edge in good condition. A cutting guide is used to insure straight cuts. The tape is 1 inch (25 mm) wide semi-transparent pressure-sensitive tape with an adhesion strength of 36 plus or minus 2.5 oz/in. (40 plus or minus 2.8 g/mm) with when tested in accordance with ASTM Test Method B 1000.

In the test, an area free of blemishes and minor surface imperfections on the coating is selected. Care should be placed with the center of tape at the intersection of the cuts with the tape running in the same direction as one set of the cuts. The tape is smoothed in place by finger in the area of the cuts and then rubbed firmly with a eraser on the end of a pencil. Within ninety plus or minus 30 seconds of application, the tape is removed by creasing a free end and pulling it off rapidly without jerking back upon itself at as close an angle of 180° as possible. The cut area is then inspected for removal of coating from the substrate and rated for adhesion according to the following scale:

The coatings were designated "pass" if:
  the edges of the cuts are completely smooth; none of the squares of the lattice is detached., or
  small flakes of the coating are detached at intersections; less than 5% of the area is affected, or
  small flakes of the coating are detached along edges and at intersections of cuts.
  The area affected is 5 to 15% of the lattice.

The coating was designated "Fail" if:
  the coating has flaked along the edges and on parts of the squares. The area affected is 15 to 35% of the lattice, or
  the coating has flaked along the edges of cuts in large ribbons and whole squares have detached. The area affected is 35 to 65% of the lattice.

In the formulations:
  K-FLEX 188™ is an aliphatic polyester polyol available from King Industries, Norwalk, Conn.
  The vinyl primer used was T-15184 available from the 3M Company
  XP-383 is a blocked acid catalyst available King Industries

TABLE 5

| Example | Coating Composition (g) | Plasticizer (g) | K-FLEX 188 (g) | Vinyl primer (g) | XP-383 catalyst (g) | Crosshatch test |
|---|---|---|---|---|---|---|
| 59 | 7.26 | — | 0.55 | 0.88 | 0.7 | pass |
| 60 | 5.8 | 0.09 | 0.44 | 0.7 | 0.56 | pass |
| 61 | 5.9 | 0.09 | 0.54 | — | 0.6 | pass |
| 62 | 6.9 | — | 0.63 | — | 0.67 | pass |
| 63 | 16.5 | — | 0.25 | — | 1.5 | pass |
| 64 | 11.8 | — | 0.36 | — | 0.35 | pass |
| 65 | 6.86 | — | 0.52 | — | 0.67 | pass |

What is claimed is:

1. A curable fluorine-containing coating composition comprising:
   (i) an amino resin,
   (ii) an addition fluorocopolymer comprising a copolymer of a fluorinated monomer having a fluorocarbon group of at least 3 carbon atoms and a non-fluorinated monomer having a crosslinking group capable of reacting with said amino resin at elevated temperature, and
   (iii) a hardening agent capable of crosslinking with said amino resin at elevated temperature,
   wherein said fluorocopolymer of the formula:

$$X-(\underset{\underset{R_f}{\overset{Q}{|}}}{\overset{R^4}{\underset{|}{C}}}-\underset{R^5}{\overset{R^5}{\underset{|}{C}}})_a-(\underset{R^6}{\overset{R^6}{\underset{|}{C}}}-\underset{R^6}{\overset{R^6}{\underset{|}{C}}})_b-Z$$

wherein:
   $R^4$ is hydrogen, halogen, or straight chain or branched chain alkyl containing 1 to about 4 carbon atoms;
   each $R^5$ is independently hydrogen or straight chain or branched chain alkyl containing 1 to about 4 carbon atoms,
   each $R^6$ is independently hydrogen, halogen, or an organic group;
   Q is an organic linking group;
   $R_f$ is a fluoroaliphatic group or a fluoroether group;
   X is a group derived from a free-radical initiator;
   Z is H, a residue of a chain transfer agent or a residue of a silane coupling agent; and
   a and b are numbers greater than 1 and a+b is sufficient to render the fluorocopolymer polymeric.

2. A curable composition according to claim 1 wherein said amino resin is a methylolated amine or an alkoxylated derivative thereof.

3. A curable composition according to claim 2 wherein said methylolated amine or alkoxylated derivative thereof are selected from the group consisting of methylolated melamines, methylolated urea, methylolated benzoguanamine, and methylolated acetoguanamine and alkoxylated derivatives thereof.

4. A curable composition according to claim 1 wherein said fluorinated monomer is selected from the group consisting of N-methyl perfluorooctanesulfonamidoethyl acrylate, N-methyl perfluorooctanesulfonamidoethyl methacrylate, N-ethyl perfluorooctanesulfonamidoethyl acrylate, N-methylperfluorohexylsulfonamidoethyl acrylate, the reaction product of isocyanatoethylmethacrylate and N-methylperfluorooctanesulfonamidoethyl alcohol, perfluorooctyl acrylate, N-methyl perfluorooctanesulfonamidoethyl vinyl ether, $C_8F_{17}SO_2NHCH_2CH=CH_2$, perfluorocyclohexyl acrylate, and tetrameric hexafluoropropylene oxide dihydroacrylate.

5. A curable composition according to claim 1 wherein said non-fluorinated monomer is selected from the group consisting of N-methylol acrylamide; N-methylol methacrylamide; aziridinyl acrylate and methacrylate; diacetone acrylamide and methacrylamide; methylolated diacetone acrylamide and methacrylamide; 2-hydroxy-3-chloropropyl acrylate and methacrylate; hydroxy ($C_2$ to $C_4$) alkyl acrylates and methacrylates; maleic anhydride; allyl alcohol; allyl glycolate; isobutenediol; allyloxyethanol; o-allyl phenol; divinyl carbinol; glycerol α-allylether, acrylamide; methacrylamide; maleamide; maleimide; N-cyanoethyl acrylamide; N-isopropyl acrylamide; glyoxal bis-acrylamide; metal salts of acrylic acid and methacrylic acid; vinylsulfonic and styrene p-sulfonic acids and their metal salts; 3-aminocrotonitrile; monoallylamine; vinylpyridines; n-vinylpyrrolidone; 2-acrylamido-2-methylpropanesulfonic acid (AMPS) and its salts; vinyl azlactones; glycidylacrylate and methacrylate; allyl glycidyl ether; acrolein; N,N-dimethylaminoethyl acrylate and methacrylate; N-tert-butylaminoethyl methacrylate; allyl methacrylate; diallyl maleate; vinyltriethoxysilane; and vinyltrichlorosilane.

6. The fluorocopolymer of claim 1 wherein the $R_f$ group contains from 6 to 14 carbon atoms.

7. The fluorocopolymer of claim 1 in which the ratio of moles of polymerized units derived from the fluorochemical monomer to polymerized units derived from the non fluorochemical monomer is in the range of 10:1 to about 3:2.

8. The fluorocopolymer of claim 1 comprising 30 to about 80 weight percent fluorinated monomer based on the total weight of the fluorocopolymer.

9. The fluorochemical copolymer of claim 1 further comprising a chain-transfer agent.

10. The fluorochemical copolymer of claim 1 further comprising a silane coupling agent.

11. The curable composition of claim 1 wherein the amount of said hardening agent is from 10 to 30 weight percent relative to the combined weights of the amino resin and fluorocopolymer.

12. The composition of claim 1 wherein the hardening agent is selected from copolymers of lower alkyl methacrylates wherein the lower alkyl group contains 1–3 carbon atoms; copolymers of cycloalkyl acrylates with methacrylates wherein the cycloalkyl group contains 5–7 carbon atoms; hard vinyl monomers copolymerized with a functional vinyl monomers capable of crosslinking with the amino resin, polymers and copolymers of functional monomers of carboxylic acid monomer including with acrylic, methacrylic, itaconic, maleic and crotonic acids and monoalkyl esters of itaconic and maleic acids wherein the alkyl group contains 1–8 carbon atoms, methacrylonitrile, acrylamide, methacrylamide, and acrylonitrile; polyols, epoxy resins, novolac resins, and polyamines.

13. A curable composition according to claim 1 wherein said fluorocopolymer is a copolymer of said fluorinated monomer and a non-fluorinated monomer comprising a crosslinking group and one or more additional comonomers.

14. The composition of claim 1 in which the crosslinking group of the non-fluorinated monomer is selected from the group of amines, amides, epoxides, hydroxyl, carboxyl and silane.

15. The composition of claim 1 in which the non-fluorinated monomer is selected from the group of N-methylol acrylamide, N-methylol methacrylamide; aziridinyl acrylate and methacrylate; diacetone acrylamide and methacrylamide, methylolated diacetone acrylamide and methacrylamide, 2-hydroxy-3-chloropropyl acrylate and methacrylate; hydroxy ($C_2$ to $C_4$) alkyl acrylates and methacrylates; maleic anhydride; allyl alcohol; allyl glycolate, isobutenediol; allyloxyethanol; o-allyl phenol; divinyl carbinol; glycerol a-allylether, acrylamide; methacrylamide; maleamide; maleimide; N-cyanoethyl acrylamide; N-isopropyl acrylamide; glyoxal bis-acrylamide, metal salts of acrylic acid and methacrylic acid; vinylsulfonic and styrene p-sulfonic acids and their metal salts; 3-aminocrotonitrile; monoallylamine; vinylpyridines; n-vinylpyrrolidone; 2-acrylamido-2-methylpropanesulfonic acid (AMPS) and its salts; vinyl azlactones; glycidylacrylate and methacrylate; allyl glycidyl ether; acrolein; N,N-dimethylaminoethyl acrylate and methacrylate; N-tert-butylaminoethyl methacrylate; allyl methacrylate; diallyl maleate; vinyltriethoxysilane; and vinyltrichlorosilane.

16. A curable composition according to claim 1 wherein weight ratio of the amino resin to the fluorochemical copolymer is in the range of 95:5 to 60:40.

17. A heat curable composition according to claim 1 wherein weight ratio of the amino resin to the fluorochemical copolymer is in the range of 90:10 to 70:30.

18. A method of preparing a coated substrate comprising the steps of:
    (a) providing the composition of claim 1
    (b) adding an acid catalyst to the mixture
    (c) coating at least part of one surface of a substrate and
    (d) curing said heat curable composition at a temperature of at least 60° C.

19. The method of claim 18 in which the acid catalyst is a blocked acid catalyst.

20. A method according to claim 18 wherein said mixture further comprises a solvent.

21. A method according to claim 18 wherein said solvent is water.

22. A method according to claim 18 wherein said substrate is paper, wood, plastic, metal, ceramics or glass.

23. A coated substrate having a cured coating comprising the composition of claim 1.

24. The coated substrate of claim 23 wherein said fluorocopolymer is a copolymer of a non-fluorinated monomer comprising a crosslinking group and one or more additional comonomers.

25. The coated substrate of claim 23 wherein said substrate comprises paper, wood, metal, ceramic, plastic or glass.

\* \* \* \* \*

UNITED STATES PATENT AND TRADEMARK OFFICE
CERTIFICATE OF CORRECTION

PATENT NO. : 6,168,866 B1
DATED : January 2, 2001
INVENTOR(S) : Clark, Gregory D.

It is certified that error appears in the above-identified patent and that said Letters Patent is hereby corrected as shown below:

Column 9,
Table B, first column, second formula "NA¢CH$_2$—" should read -- NA'CH$_2$— --

Column 17,
Example 40, second column "/MFA" should read -- /MPA --

Column 25,
Line 2, "monomer including with" should read --monomer with --
Line 20, "acrylamide," should read -- acrylamide; --
Line 22, "methacrylamide," should read -- methacrylamide; --
Line 23, "methacrylamide," should read -- methacrylamide; --
Line 25, "glycolate," should read -- glycolate; --
Line 29, "bis-acrylamide," should read -- bis-acrylamide; --

Signed and Sealed this

Fifteenth Day of October, 2002

Attest:

Attesting Officer

JAMES E. ROGAN
Director of the United States Patent and Trademark Office